United States Patent [19]

Skogman et al.

[11] 4,134,830
[45] Jan. 16, 1979

[54] METHOD OF PURIFYING WASTE WATER

[75] Inventors: Harald Skogman, Skanör; Lennart Huss, Malmö, both of Sweden

[73] Assignee: Svenska Sockerfabriks AB, Malmo, Sweden

[21] Appl. No.: 825,852

[22] Filed: Aug. 18, 1977

Related U.S. Application Data

[63] Continuation of Ser. No. 677,551, Apr. 16, 1976, abandoned.

[30] Foreign Application Priority Data

Apr. 25, 1975 [SE] Sweden ............................ 7504850

[51] Int. Cl.$^2$ .................................................. C02C 1/14
[52] U.S. Cl. ........................................ 210/5; 210/16; 210/38 R; 210/DIG. 28; 48/197 A
[58] Field of Search ............................... 210/2–7, 210/11, 15, 16, DIG. 28, 38 R, 18; 48/197 A

[56] References Cited

U.S. PATENT DOCUMENTS

| | | | |
|---|---|---|---|
| 3,429,806 | 2/1969 | Carter et al. | 210/16 |
| 3,520,802 | 7/1970 | Pavia | 210/5 |
| 3,579,439 | 5/1971 | Meiring et al. | 210/DIG. 28 |
| 3,723,308 | 3/1973 | Breck | 210/38 R |
| 3,824,185 | 7/1974 | Caldwell et al. | 210/DIG. 28 |
| 3,838,199 | 9/1974 | Coe et al. | 210/2 |

FOREIGN PATENT DOCUMENTS 74-62502  6/1974  Japan .......................................... 210/16

OTHER PUBLICATIONS

Lawrence A. W.; "Application of Process Kinetics to Design of Anaerobic Processes"; found in Anaerobic Biological Treatment Processes; A.C.S. (1971).

*Primary Examiner*—Charles N. Hart
*Assistant Examiner*—Benoit Castel
*Attorney, Agent, or Firm*—Burns, Doane, Swecker & Mathis

[57] ABSTRACT

A method of biologically purifying waste water rich in carbohydrates or proteins, wherein the waste water is treated in an anaerobic stage while leading off generated methane gas, sludge-bearing water formed being subjected to sludge separation during formation of a first sludge concentrate which is returned to the anaerobic stage, and that the water thus treated is treated in an aerobic stage, sludge-bearing water formed being subjected to slude separation during formation of a second sludge concentrate, of which at least a portion is returned to the aerobic stage, while possible excess is returned to the anaerobic stage, a portion of the first, and possibly also of the second sludge concentrate being led off for disposal.

7 Claims, 2 Drawing Figures

METHOD OF PURIFYING WASTE WATER

This is a continuation, of Application Ser. No. 677,551, filed Apr. 16, 1976, and now abandoned.

The present invention relates to a method of biologically purifying waste water rich in carbohydrates and protein.

In the treatment of waste water, which is heavily loaded or polluted with carbohydrates and proteins, e.g. from sugar factories, starch factories or preserving industries, while applying conventional purifying technology, such as the method of using aerobically activated sludge, there arise difficultly mastered problems pertaining to the formation of sludge with poor sedimentation ability, so-called floating sludge. Furthermore, the process usually gives low purification efficiency, since organic nitrogen compounds are only broken down with difficulty in the process. Large quantities of energy are consumed in supplying the required amount of oxygen for the destruction process. In this known technology large quantities of biological sludge are formed, which are only dewatered with difficulty and therefore constitute an undesirable environmental problem.

A further problem in conjunction with the known technology is the difficulty of arriving at a biological process having sufficiently high stability for its easy practical performance.

The present invention has the object of providing a method whereby the drawbacks indicated above are avoided and which can be performed in practice in a simple manner, since the biological process has very great stability in practical operation. The method according to the invention is based on biological purification in two stages, a first anaerobic stage and a second aerobic stage. In the anaerobic stage the sludge content is kept at a high level, while selecting the conditions so that methane fermentation with subsequent reduction of the pollutants is obtained. Water containing sludge, formed in the anaerobic stage, is subsequently exposed to sludge separation while forming a first sludge concentrate which is returned to the anaerobic stage, i.e. it is recirculated. After said sludge separation, the water treated in the first stage is treated in the aerobic stage, where remaining pollutants, thanks to the conversion in the anaerobic stage, are present in such a form, that they can easily be utilized by aerobic organisms. The sludge-bearing water formed in the aerobic stage is subjected to sludge separation while forming a second sludge concentrate at least a portion of which is returned to the aerobic stage while possible surplus is recirculated to the anaerobic stage. Sludge from the first sludge concentrate and possibly also from the second sludge concentrate is drawn off and taken away for disposal.

In the method according to the present invention, the greater portion of the content of organic material in the waste water is preferably decomposed in the anaerobic first stage, while the remainder is taken care of in the subsequent aerobic stage. Up to about 80-90% of the total pollutant content can thus be dealt with in the anaerobic decomposition.

In a particularly preferred embodiment of the method according to the invention, a portion of the second sludge concentrate is returned to the aerobic stage, while the rest is recirculated to the anaerobic stage for destruction, whereafter sludge concentrate for disposal is only removed from the process at the first sludge concentrate obtained from the anaerobic stage.

The present invention has the substantial advantage that in the anaerobic stage the major portion of the nitrogen compounds are converted to ammonia, which can be removed from the water comparatively easily.

In the treatment of protein-bearing waste water, i.e., water containing a large proportion of organic nitrogen compounds, it is thus a preferred step to remove the ammonium ions formed in the anaerobic stage before the treated water is transferred to the aerobic stage. Such removal can be accomplished by adding an alkali and driving off the ammonia liberated hereby. The amount of alkali is suitably adjusted for attaining a pH of 9-11. Liberated ammonia can be driven off by blowing air through the water.

An alternative method of removing ammonium ions is to pass the water through a cation exchanger, suitably a sodium saturated cation exchanger.

As previoulsy indicated, the technique according to the present invention signifies substantial advantages. Thus in relation to the conventional technique, only a fraction of the usual amount of sludge is obtained. With optimum conditions, the amount of sludge can be reduced to only about a tenth of what is usual, while obtaining a greater proportion of dry substance e.g. 10 percent by weight. This is in contradistinction to the conventional technique, whereby a substantially lower dry substance content is obtained, usually about 2 percent by weight. The advantages brought about by the technique according to the invention will thus be easily appreciated.

Earlier in this disclosure the advantage of great stability in the biological process has been mentioned. This stability is primarily conditioned by the buffer action brought about by recirculating the sludge concentrate to the anaerobic stage. The stability in this stage in its turn results in substantially improved stability in the following aerobic stage, which is recognised as normally being very sensitive to disturbances in the form of variations in the composition of the incoming materials. The total result is a process which is easy to control, and which works in a satisfactory way, in spite of variations in the incoming waste water.

The method according to the present invention can to advantage be combined with treatment of lightly loaded waste water, which together with the treated water leaving the anaerobic stage, can be led to the aerobic stage.

BRIEF DESCRIPTION OF THE DRAWINGS

The invention will be further illustrated in the following by means of non-limiting examples in conjunction with the appended drawing, where FIGS. 1 and 2 diagramatically show block diagrams over the process, as respectively adapted to the treatment of waste water having a low content and a high content of nitrogen contaminants.

According to FIG. 1, the plant for treating waste water which is poor in nitrogen consists of a tank 1 for complete mixing, where the anaerobic fermentation is carried out. The methane gas formed during this treatment is recovered at 2. The treated water containing anaerobic sludge is transferred to a sludge separating apparatus 3, which can consist of a lamella separator, a sedimentation basin, a decanting centrifuge or other suitable equipment. From the separating apparatus 3, a proportion of the sludge is recirculated to the tank 1, while the remainder is led off for disposal.

The water thus treated is led off for treatment with aerobically activated sludge in a closed tank, an earth basin, a concrete basin or other suitable apparatus, generally denoted by the numeral 7 allowing oxygenation. The water treated in 7 is further led to a sludge separator/thickener 8, from which separated sludge is recirculated to the tank 1, while the purified water is led away for disposal or other purposes. A part of the sludge separated in 8 is recirculated to the activated sludge apparatus 7.

Figure 1:
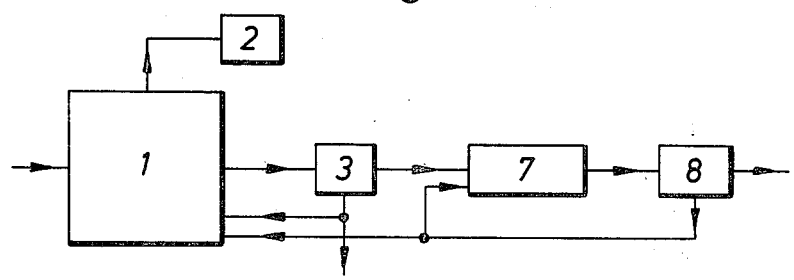
Figure 2:
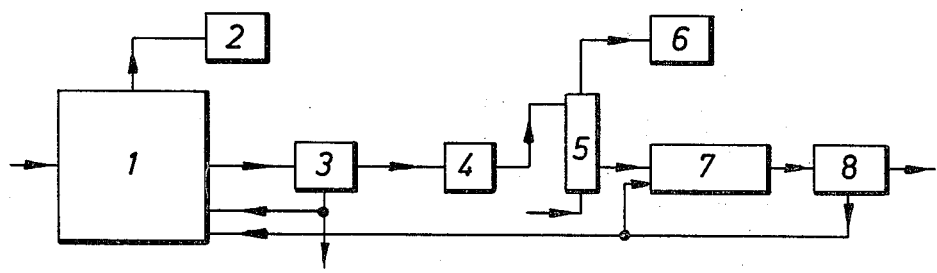

The plant in FIG. 2 is intended for treating waste water having a high content of nitrogen pollutants, and differs from the one illustrated in FIG. 1 only with regard to the equipment coupled in between the anaerobic and aerobic stages, said equipment consisting of an apparatus 4 for adding alkali, a stripper 5 for driving off ammonia formed, and an apparatus 6 for reclaiming driven-off ammonia. The stripper 5 is at its lower end supplied with air for removing the ammonia, while the ammonia-bearing water is supplied at the upper end of the stripper.

EXAMPLE 1

This example deals with the treatment of water from the sugar factory of Ortofta in Sweden. The water contains about 0.4 percent by weight of carbohydrates and has a $BOD_5$ of about 5000 mg $O_2$/l. ($BOD_5$ is here defined as the oxygen consumption during 5 days of a sample kept in darkness at 20° C.) The water is treated in a plant according to FIG. 1, where the tank 1 has a volume of about 0.5 $m^3$. The BOD load in relation to water supplied is about 1 kg per $m^3$ per 24 hours. In the tank there is a temperature of about 35° C., a pH of about 7 and a sludge content of about 10 g/l.

In accordance with what is stated hereinbefore, completely anaerobic conditions prevail in the tank.

Methane-bearing gas leaves the tank 1 in an amount of about 0.16 $m^3$/24 h and contains about 70 percent by volume of methane, the remainder being carbon dioxide. In the sludge separating apparatus 3, in the liquid phase (i.e., not counting the sludge), there is a $BOD_5$ of about 1000 mg $O_2$/l, a pH of about 7 and a temperature of about 35° C., while the surface load is about 0.5 m/h. Sludge-bearing material returned from the sludge separating apparatus 3 to the tank 1 is about 20 percent by volume of the water entering tank 1. From the separator 3 there is led off for disposal an amount corresponding to 1 liter per sludge per kg of the BOD coming into the tank 1.

The apparatus 7 for further treating the water with aerobically activated sludge consists of a tank reactor 7 with a volume of about 0.1 $m^3$, where complete mixing is obtained by blowing in air. The temperature of the liquid phase in the reactor 7 is about 20° C. and the BOD load about 1 kg per $m^3$ per 24 hours. The water leaving tank 7 has a pH of about 8, a sludge content of about 3 g/l and an oxygen content greater than 2 mg $O_2$/l.

The same values for temperature and pH prevail in the sludge separator 8 as in the tank 7. The surface load is about 0.5 m/h. Sludge-bearing liquid led off from the sludge separator 8 has a volume of about 40% of the water entering the tank 1, and of this liquid about ⅔ths is returned to the tank 7 while about ⅓th is recirculated to the anaerobic tank 1. The purified water leaving the sludge separator 8 has a $BOD_5$ of about 50 mg $O_2$/l, and thus does not cause any disposal difficulties when discharged into a recinient.

It may be added that the process described in this example is not started by a selective culture, but is founded on natural generation on the basis of the microorganisms to be found in the incoming waste water. It is further apparent from the example that about 80% of the incoming oxygen-consuming material taking part is broken down in the anaerobic stage while the aerobic stage has mainly taken care of remaining pollutants.

EXAMPLE 2

This example deals with the treatment of water from a factory producing yeast based on molasses. The water contains about 1 percent by weight of organic pollutants, the major portion of which are nitrogen compounds and the remainder mainly consisting of carbohydrates. The water has a $BOD_5$ of 10,000 mg $O_2$/l and is treated in a plant according to FIG. 2, which, apart from the equipment 4, 5 and 6 coupled in between both stages, completely corresponds to the plant according to FIG. 1. The BOD load on the water supplied to the tank 1 is about 2 kg per $m^3$ per 24h, there being in the tank 1 a temperature of about 35° C., a pH of about 7.5 and a sludge content of about 10 g/l.

Methane-bearing gas leaves tank 1 in an amount of about 0.3 $m^3$/24 h, and contains about 70 percent by volume of methane, the remainder being carbon dioxide. In the sludge separator 3 there is a $BOD_5$ of about 2000 mg $O_2$/l in the liquid phase (i.e., not counting the sludge), a pH of about 7.5, a temperature of about 37° C., and a surface load of about 0.5 m/h. Sludge-bearing material returned from the sludge separator 3 to the tank 1 is about 20 percent by volume of the water entering tank 1. From the separator 3 is led off for disposal an amount corresponding to one liter sludge per kg of the BOD coming into the tank 1.

In the apparatus 4 for adding alkali, quick lime is added to a pH of about 10.5. The apparatus 4 is a simple receptacle with an agitator, and has a volume such that a retention time of about half an hour is obtained. About 80% of the ammonia set free in conjunction with the addition of alkali is driven off in the stripper 5 and reclaimed in the apparatus 6.

In the apparatus 7, where the water is treated aerobically, there is a BOD load of about 2 kg per $m^3$ per 24 h, a temperature of about 20° C., a pH of about 9, a sludge content of about 6 g/l and an oxygen content exceeding 2 mg/l.

The same values for temperature and pH prevail in the sludge separator 8 as in the tank 7. The surface load is about 0.5 m/h. Sludge-bearing liquid led off from the apparatus 8 has a volume of about 40% of the water entering the tank 1, and of this liquid about ⅔ths is returned to the tank 7 while about ⅓th is recirculated to the anaerobic tank 1. The purified water leaving the sludge separator 8 has a $BOD_5$ of about 200 mg $O_2$/l and thus does not cause any difficulties when discharged to a municipal sewage plant or, after storage, to a recipient.

The process described in this example has been started by innoculation with activated digested sludge. As in example 1, about 80% of the incoming oxygen-consuming material taking part is decomposed in the anaerobic stage, while the remaining pollutants are decomposed in the aerobic stage.

What we claim is:

1. A method of biologically purifying waste water rich in carbohydrates or proteins comprising:
    (a) subjecting the waste water to an anaerobic fermentation state wherein the waste water is biologically treated with methane producing organisms under anaerobic conditions wherein substantial portions of methane gas are generated and a first sludge-bearing water is produced;
    (b) collecting said generated methane gas;
    (c) leading off said generated methane gas;
    (d) subjecting said first sludge-bearing water to sludge separation to form a first sludge concentrate and a first aqueous effluent;
    (e) returning said first sludge concentrate to the anaerobic fermentation state;
    (f) subjecting said first aqueous effluent to an aerobic fermentation stage to form a second sludge-bearing water;
    (g) subjecting said second sludge-bearing water to sludge separation to form a second sludge concentrate;
    (h) returning a fraction of said second sludge concentrate to the aerobic fermentation stage, returning the remainder of said second sludge concentrate to the anarerobic fermentation stage; and
    (i) discharging said first sludge concentrate for disposal.

2. The method of claim 1 wherein the waste water is rich in proteins, wherein ammonium ions are formed in the anaerobic fermentation stage, and wherein before the first aqueous effluent is subjected to the aerobic fermentation stage, partly removing said ammonium ions to such a degree that nutritional salt balance is maintained for fermentation in the aerobic stage.

3. The method of claim 2, wherein the ammonium ions are removed by adding alkali to the first aqueous effluent and driving off the ammonia released thereby.

4. The method of claim 3, wherein the amount of alkali is adjusted so that a pH of 9–11 is obtained.

5. The method of claim 3, wherein the ammonia released in the first aqueous effluent is driven off by blowing air through said first aqueous effluent.

6. The method of claim 2, wherein the ammonium ions are removed by passing the first aqueous effluent through a cation exchanger.

7. The method of claim 6, wherein a sodium saturated cation exchanger is used.

* * * * *